Dec. 6, 1966     E. F. BOHLAYER     3,289,263

ACCESSIBLE FASTENING MEANS

Filed March 1, 1965

INVENTOR
EDWIN F. BOHLAYER

3,289,263
ACCESSIBLE FASTENING MEANS
Edwin F. Bohlayer, 5703 Melia St., Springfield, Va.
Filed Mar. 1, 1965, Ser. No. 436,392
1 Claim. (Cl. 24—203)

The invention described herein may be manufactured and used by or for the Government of the United States of America for governmental purposes without the payment to me of any royalties thereon.

This invention relates to accessible fastening means and, more particularly, to the provision of ready access to tarpaulin connector means.

In previous connectors for tarpaulins, such as snap fasteners or turn buttons, have been so constructed as to have one of the sides of the fastener unavailable for fastening support. That is, the tarpaulin would be arranged such that it would be difficult to have any support, such as a human hand, to counter the force provided by the fastening operation. One part of the fastening means is located on each of the tarpaulin pieces to be joined. At the junction of such tarpaulin pieces, the tarpaulin itself prevents proper support for both fastening means and pressure against the one available fastening means would be opposed by pressures distributed across the flexible tarpaulin and would, therefore, make the fastening operation difficult, if not impossible. Further, prior tarpaulin fastening means provided an easy access for water to freely pass through the junction at the fastening means and entering the covered area.

The present invention provides for easy access from one side of the tarpaulin to both of the fastening means at a point where the tarpaulin is secured to another tarpaulin or to another object. Further, the structure of this invention provides a water channel that diverts the water from the tarpaulin and does not permit it to go under the tarpaulin. This invention method can be applied to any existing protective coverings.

It is, therefore, a feature of this invention to provide an accessible fastening means for a tarpaulin.

Another feature of this invention to provide a very fast and accessible fastening means for a tarpaulin which can readily be fastened or unfastened from one side of the tarpaulin.

Still another feature of this invention is to provide a junction for a tarpaulin which will prevent water from going into the area under the tarpaulin.

A further feature of this invention is to provide a readily accessible fastening means for a tarpaulin which does not require a solid backup means in order to accomplish complete fastening nor unfastening.

The exact nature of this invention as well as other objects and advantages thereof will be readily apparent from consideration of the following specification relating to the annexed drawing in which.

Briefly, this invention includes turning one edge of a tarpaulin to form a U-shaped in cross section flap. To insure that the features of this U-shape are maintained, a support means is provided at spaced intervals in the channel provided by the U-shape. These support means are of such dimension to allow human fingers, screw driver or other flat objects to be inserted in the U-channel to provide the needed backup pressure. The fastening means is secured to the part of the U-shaped material that is dimensioned large enough for mounting the fastening means whether buttons, snaps or other joining means. This U-shaped channel further provides a channel through which fluids can be carried off to the edges of the tarpaulin and not through the junction.

Figure 2:
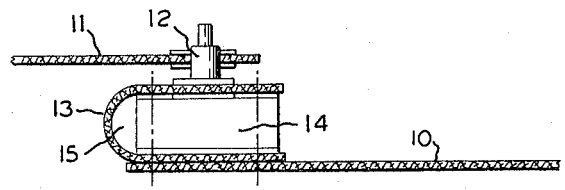
FIGURE 2 is a cross-sectional view taken on line 2—2 in FIGURE 1.
Figure 1:
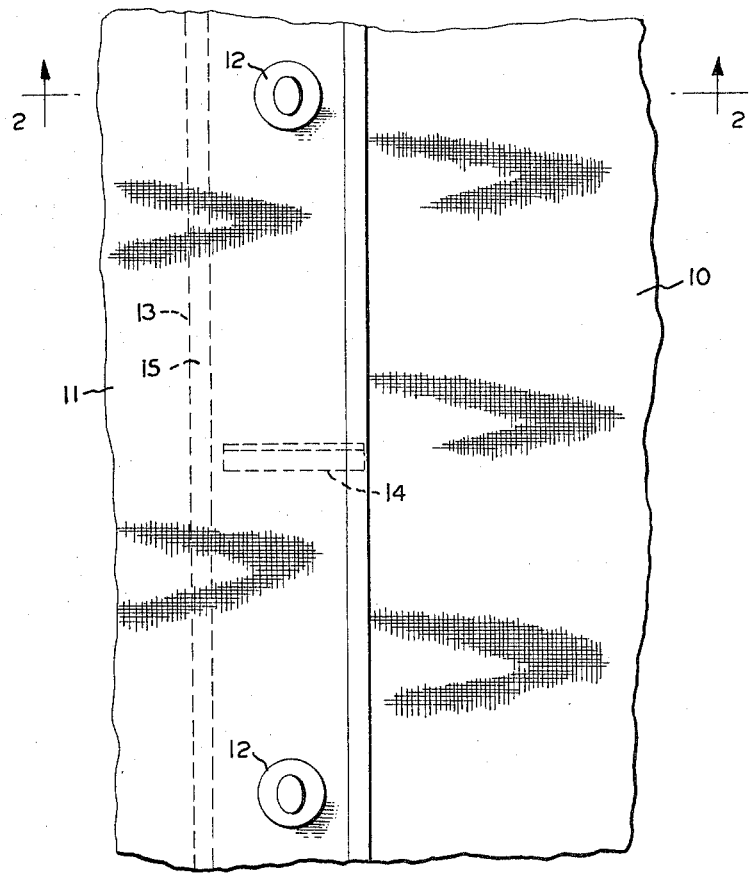
FIGURE 1 is a plan view of this invention.

Turning now to the drawing, FIGURE 1 shows the junction of fabric 10 to fabric 11 by connector means 12. As seen in FIGURE 2, one edge 13 of the fabric 10 is folded back to form a U-shaped channel 15. The edge 13 can be integral with fabric 10 or can be a supplemental piece of material attached to one edge of fabric 10. The U-shaped channel 15 is maintained by reinforcing elements 14 which are spaced at predetermined intervals along the U-shaped channel 15 and generally perpendicular to the folded edge. The number and placement of the reinforcing elements 14 are determined by the number of fastening means 12 which are made accessible from the top side, as shown in FIGURE 2, of fabrics 10 and 11. With the channel 15 available under the fasteners 12, it is easy to insert fingers or any necessary tool to give the backup pressure necessary to secure fastening means 12. One part of fastening means 12 is secured to edge 13 and the other separable part is secured to fabric 11. Upon proper operation of fastening means 12, the two fabrics 10 and 11 can easily be joined or separated. When the two fabrics 10 and 11 are joined, the easy availability of all parts of the fastening means enables the fastening and the unfastening operation to be easily accomplished. Further, the U-shaped channel 15 provides a trough to catch any water running across fabric 10 to prevent it from going between the edge 13 and the fabric 11 and onto any object under the fabrics 10 and 11. Since the U-shaped channel 15 runs the entire length of the fabric 10, the trough provided thereby directs any fluids thereon to the ends of the fabrics. The reniforcing elements 14 can be of the same fabric as the other fabrics utilized or any material which provides the U-shaped channel and if of sufficient strength to withstand the stresses applied thereto. Reinforcing element can be Z-shaped or U-shaped or any other shape that will permit the two sides of the folded edge 13 to enclose the U-shaped channel 15. The materials can be canvas, nylon, plastic sheeting, or any other material desired for a covering function.

So it is seen that I have provided an easily accessible and fast operated fastening means for tarpaulins, tenting and any protective covering means. The U-shaped channel provides room for the backup pressure means to be inserted from the same side of the tarpaulin as the side to which a second tarpaulin is connected or a structure to which the first tarpaulin is connected. The U-shaped channel is a rain catch and directs fluids to the outer edges of the tarpaulin and not through the junction. Snow and ice in the arctic and winter seasons will melt on a cover from heat generated by operation of equipment covered thereby. This causes water to run under connections without the protection provided by this invention. The savings in time, energy, and completion of operation are noteworthy. The further usefulness of this invention in arctic regions enables tarpaulins to be secured within the limits of tolerable exposure to such arctic climates, a solution which removes the hazard inherent in the prior tarpaulin connecting procedures where at times it may be necessary to close a cover while many moving mechanical and electrical parts are in operation.

Obviously many modifications and variations of the present invention are possible in the light of the above teachings. It is therefore to be understood, that within the scope of the appended claims, the invention may be practiced otherwise than as specifically described.

What is claimed is:

In combination:
    a first sheet of fabric having a first edge means,
    a continuous fold in said first edge means providing a U-shaped channel means along the entire length of said first edge means, said U-shaped channel means providing a path for the flowing of fluids from the fabric at the ends of said edge means, and a plurality of reinforcing means in said U-shaped channel means each having a first and a second securing portion, said first securing portion secured to one of the straight portions of said U-shaped channel means and said second securing portion secured to the other of the straight portions of said U-shaped channel means, said reinforcing means maintaining the U-shaped configuration of said channel means; and a second sheet of fabric having a second edge means, a fastening means having one portion secured outwardly of said U-shaped channel means to said first edge means and a second portion secured to said second edge means.

References Cited by the Examiner

UNITED STATES PATENTS

| | | | |
|---|---|---|---|
| 622,220 | 4/1899 | Goldsborough | 24—203 X |
| 3,196,459 | 7/1965 | Grazia | 2—96 |

FOREIGN PATENTS

| | | |
|---|---|---|
| 679,923 | 8/1939 | Germany. |
| 19,921 | 9/1914 | Great Britain. |

BERNARD A. GELAK, *Primary Examiner.*